United States Patent
Madau et al.

(10) Patent No.: US 9,537,337 B2
(45) Date of Patent: Jan. 3, 2017

(54) SELECTING A CONFIGURATION OF COILS IN RESPONSE TO A MULTI-COIL WIRELESS CHARGING SYSTEM INITIATING CHARGING

(71) Applicants: Dinu Petre Madau, Canton, MI (US); Gary Edward Zack, Novi, MI (US)

(72) Inventors: Dinu Petre Madau, Canton, MI (US); Gary Edward Zack, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 224 days.

(21) Appl. No.: 14/339,025

(22) Filed: Jul. 23, 2014

(65) Prior Publication Data

US 2016/0028266 A1 Jan. 28, 2016

(51) Int. Cl.
*H02J 7/00* (2006.01)
*H02J 7/02* (2016.01)

(52) U.S. Cl.
CPC .............. *H02J 7/0052* (2013.01); *H02J 7/025* (2013.01); *H02J 50/10* (2016.02); *H02J 7/0042* (2013.01)

(58) Field of Classification Search
CPC ......... H02J 7/025; H01F 38/14; Y02T 90/112; B60L 11/182; Y02E 60/12
USPC ........................................................ 320/108
See application file for complete search history.

(56) References Cited

U.S. PATENT DOCUMENTS

| | | | | |
|---|---|---|---|---|
| 2004/0145342 A1* | 7/2004 | Lyon | ....................... | H02J 7/025 320/108 |
| 2009/0230777 A1 | 9/2009 | Baarman et al. | | |
| 2010/0201513 A1 | 8/2010 | Vorenkamp et al. | | |
| 2010/0259217 A1 | 10/2010 | Baarman et al. | | |
| 2012/0139356 A1* | 6/2012 | Jung | ....................... | H02J 7/025 307/104 |
| 2012/0212178 A1 | 8/2012 | Kim | | |
| 2012/0313579 A1* | 12/2012 | Matsumoto | ............. | H02J 7/025 320/108 |
| 2013/0221913 A1 | 8/2013 | Kim | | |

(Continued)

FOREIGN PATENT DOCUMENTS

EP 2493051 A2 8/2012
WO 2012/170822 A2 12/2012

OTHER PUBLICATIONS

WiTricity Announces Breakthrough Wireless Charging System for Consumer Electronic Devices Including iPhone 5—Revolutionary charging system wirelessly powers multiple devices over distance and through tabletops, http://www.businesswire.com/news/home/20140107005988/en,Jan. 7, 2014 (3 pages), Business Wire—A Berkshire Hathaway Company.

(Continued)

*Primary Examiner* — Arun Williams
(74) *Attorney, Agent, or Firm* — Dickinson Wright PLLC

(57) ABSTRACT

A system and method for selecting a configuration of coils in response to a multi-coil wireless charging system initiating charging are provided. The system includes a ping generator to measure a reference coil peak voltage for each of the coils of the multi-coil wireless charging system; an object detector to detect that an object is placed on a surface associated with the wireless charging system; a charge detector to detect that the object is chargeable; and in response to the object being chargeable, a switch transmitter determines which of the coils of the multi-coil wireless charging system to connect to a power source.

7 Claims, 5 Drawing Sheets

(56) References Cited

U.S. PATENT DOCUMENTS

2013/0278206 A1 10/2013 Won et al.
2014/0002013 A1 1/2014 Kossi et al.

OTHER PUBLICATIONS

Singh, Manjit et al., "Wireless Power Charging with Spacial Freedom," http://www.low-powerdesign.com/120706-article-wireless-power-charging.htm, (4 pages), Low-Power Design.

* cited by examiner

| POSITION | COLL_PEAK_V_AD(MV) |
|---|---|
| LEFT -18 | 537.58 |
| -16 | 512.54 |
| -14 | 448.31 |
| -12 | 408.14 |
| -10 | 409.3 |
| -8 | 386.46 |
| -6 | 337.98 |
| -4 | 295.98 |
| -2 | 277.42 |
| CENTERED 0 | 268.11 |
| 2 | 286.18 |
| 4 | 339.92 |
| 6 | 389.89 |
| 8 | 417.41 |
| 10 | 457.52 |
| 12 | 463.62 |
| 14 | 528.52 |
| 16 | |
| RIGHT 18 | |
| NOTHING ON TX | 528.85 |

SELECTING A CONFIGURATION OF COILS IN RESPONSE TO A MULTI-COIL WIRELESS CHARGING SYSTEM INITIATING CHARGING

CROSS-REFERENCE TO RELATED APPLICATION

This application is related to U.S. patent application Ser. No. 14/339,147, filed on Jul. 23, 2014, which is assigned to the same assignee as the current application, and all of which are incorporated by reference in its entirety as if fully set forth herein.

BACKGROUND

Mobile electronics and devices are becoming increasingly popular. Often times, the mobile device includes an energy storage device, and employs the power in the energy storage device to operate the functionality associated with the mobile device. The mobile device may be, but is not limited to, a smart phone, a tablet, a laptop, or the like.

In order to charge the mobile device, a wired power charging system has been conventionally provided. An operator of the mobile device may connect the mobile device to a charging source (for example, a wall outlet or a vehicle electricity adapter), and wait for the device to become charged fully, or more. The connection may be permeated via a wire, or a socket associated with the mobile device that allows a user to plug in the mobile device into a charging source.

In recent years, the concept of wired charging has been replaced or augmented by wireless charging. The early implementations of wireless charging employed a coil that transmitted wireless energy to a mobile device. The mobile device would be equipped with a technique to receive the wireless energy, and translate the wireless energy to usable and storable power.

In this implementation, a singular coil is provided. Thus, an implementer of this sort of wireless charging may provide various indicia that serves to guide a user of a location or context of where to place the mobile device. In this way, the user is effectively guided in placing the mobile device in an area that optimizes and ensures wireless charging efficiency.

Recently, a plethora of mobile devices have been released. The various mobile devices each have different sizes and charging capabilities. Accordingly, the single coil system may not effectively serve the wireless charging demands of a user.

To counter this concern, a wireless surface or sheet is provided. Accordingly, a user may place their mobile device on the wireless surface or sheet, and in response to this action, initiate a charging of the wireless device. Thus, a user may not be prompted to place the device in specific location.

The wireless surface or sheet, to permeate wireless charging, may be provided with multiple coils. Each coil may be selectively turned on and off at different times to initiate the charging of a mobile device. Each coil may wireless charge the mobile device with a varying amount of power and efficiency.

SUMMARY

A system and method for selecting a configuration of coils in response to a multi-coil wireless charging system initiating charging are provided. The system includes a ping generator to measure a reference coil peak voltage for each of the coils of the multi-coil wireless charging system; an object detector to detect that an object is placed on a surface associated with the wireless charging system; a charge detector to detect that the object is chargeable; and in response to the object being chargeable, a transmitter coil switch determines which of the coils of the multi-coil wireless charging system to connect to a power source.

DESCRIPTION OF THE DRAWINGS

The detailed description refers to the following drawings, in which like numerals refer to like items, and in which.

DETAILED DESCRIPTION

Figure 1:
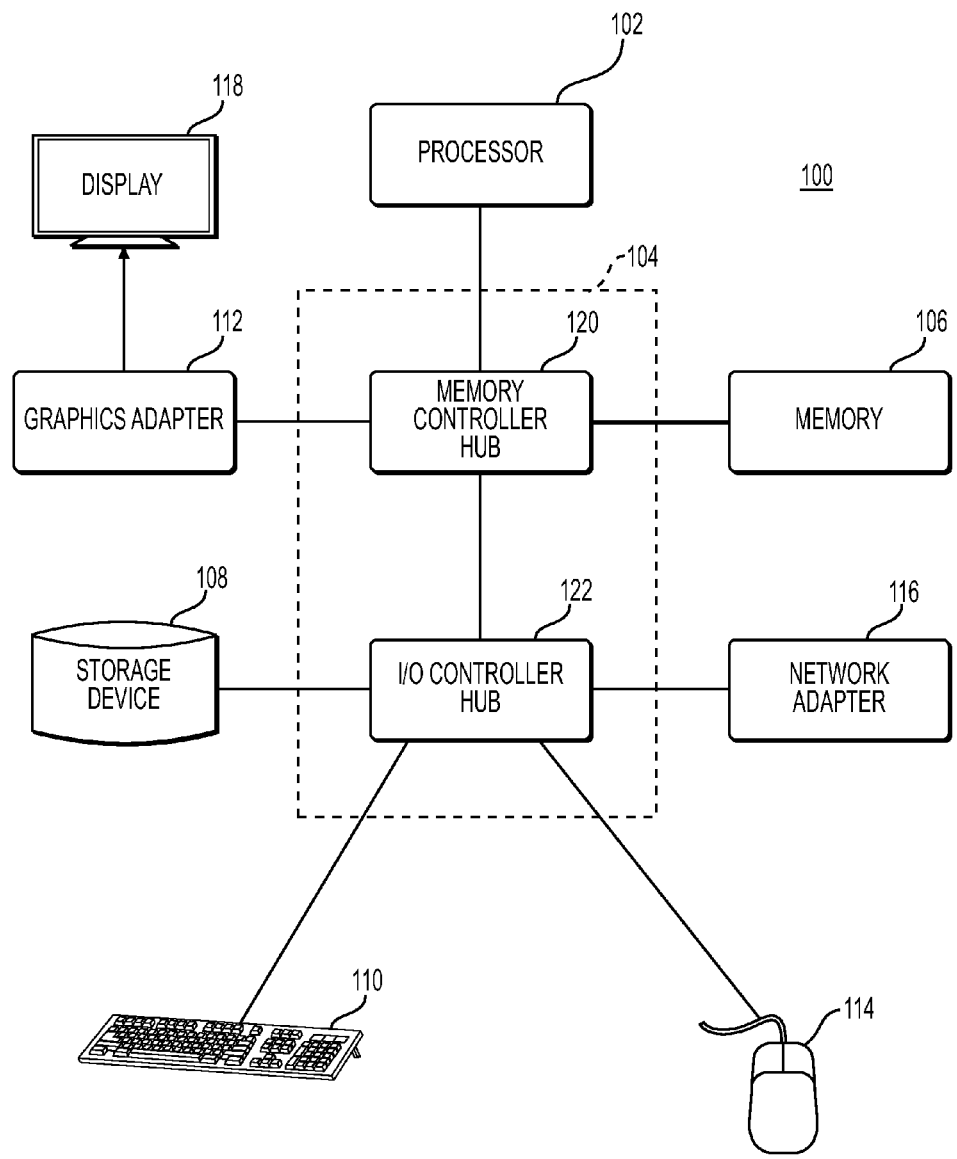
FIG. 1 is a block diagram illustrating an example computer.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Providing wireless charging to a user allows a mobile device to be effectively charged while avoiding the hassle of employing wires and other intermediary connecting techniques. In one example of wireless charging, a metal coil is employed to wirelessly generate energy, and transmit the energy over a space. A mobile device may be equipped with a receiver that receives the wireless energy, and translates the received wireless energy in power that may be employed to operate the device. A mobile device may be any device in which charging is required, such as a smart phone, a tablet, a wearable watch, and the like.

As explained in the Background section, wireless surfaces may be implemented and provided to the user. Wireless surfaces have multiple coils (and thus, may be referred to as a "multi-coil system"). The multi-coil system may employ a plurality of coils, with each coil being capable of delivering energy to the mobile device.

Depending on the placement of the mobile device onto the wireless surface, the charging of an individual coil may be improved or worsened. The ability to charge a mobile device from a single coil is dependent on various factors, one of which is the location relative to the device being charged.

Thus, when multi-coil system is employed, charging from some of the coils situated and provided in the wireless charging surface may be inefficient. For example, if power is delivered to a coil with a low efficiency of charging, the efficacy of the wireless charging surface may be lessened as a whole.

However, a wireless charging system may not know the placement of the mobile device prior to the charging. Every time a user places a device on the wireless charging surface, the placement may be in a different location. Further, the placement may be dependent on other factors, such as the device being placed on the wireless charging surface, or the size of the device being placed down. The wireless charging system may detect the placement; however, employing location detecting circuitry may render the wireless charging system expensive and bulky.

Disclosed herein are methods and systems for selecting a configuration of coils in response to a multi-coil wireless charging system initiating charging. Thus, when a mobile device is placed on a wireless surface or a switch is engaged to commence wireless charging, an optimal configuration of coils being employed to wirelessly charge the mobile device may be selected.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network.

Figure 2:
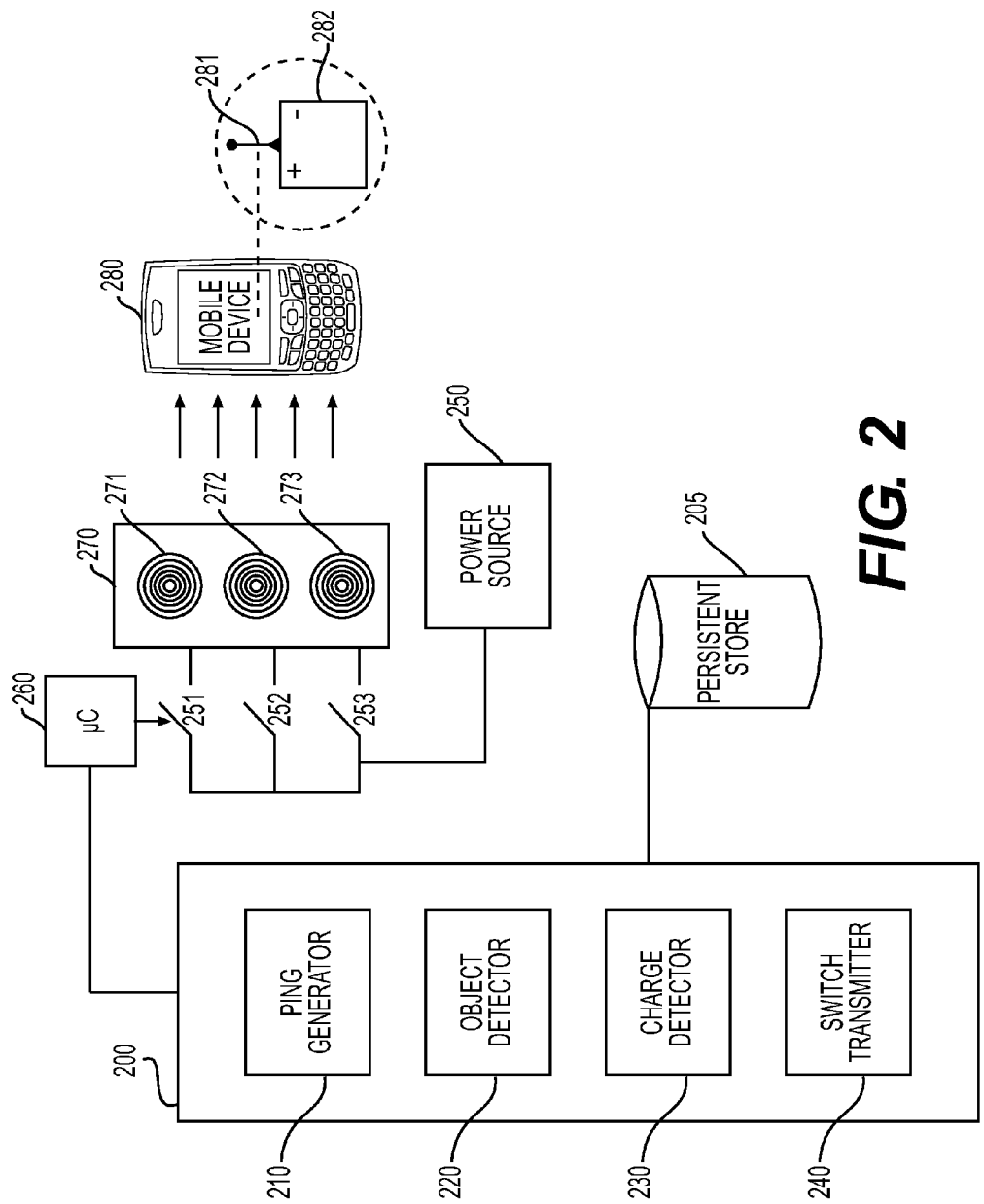
FIG. 2 is an example of a system for selecting a configuration of coils in response to a multi-coil wireless charging system initiating charging.

FIG. 2 is an example of a system 200 for selecting a configuration of coils in response to a multi-coil wireless charging system initiating charging. The system 200 includes a ping generator 210, an object detector 220, a charge detector 230, and a switch transmitter 240.

The system 200 may be implemented via a device, such as computer 100 described above. The system 200 may be implemented with a persistent store 205, which may be any of the storage devices enumerated above with regards to storage device 108.

The system 200 communicates with a microcontroller 260. The microcontroller 260 may be any sort of switching controlling device that allows switches 251-253 to be selectively opened and closed. The switches 251-253, allow energy from a power source 250 to be transmitted to a corresponding coil (271-273) of a wireless charging surface 270.

The wireless charging surface 270 shown includes three coils (coils 271-273). In the example described below, three coils are shown; however, one of ordinary skill in the art may implement the aspects described herein with any number of coils greater than one. The coils 271-273 may be embedded in a surface or mat.

In response to a mobile device 280 being placed on the surface 270, wireless charging may occur. One of switches 251-253 may be turned on, which allows power source 250 to energize a corresponding coil 271-273. The corresponding coil wirelessly transmits energy to the mobile device 280's receiver 281. The receiver 281 may then transmit power to the battery 282 or to the mobile device 280.

The ping generator 210 operates prior to any interaction with the wireless charging surface 270 and an object placed on the wireless charging surface 270 (such as the mobile device 280). The ping generator 210 generates a reference peak coil peak voltage for each of the coils 271-273. The coil peak voltage is a measurement of the voltage that each coil generates. This reference voltage may be stored in the persistent store 205.

The ping generator 210 may operate by instructing the microcontroller 260 to cycle each of the switches 251-253, and then, measure the coil peak voltage for each corresponding one of the coils 271-273 when the corresponding switch is closed.

The object detector 220 detects that the coil peak voltage has changed. The microcontroller 260 may cycle the switches 251-253 periodically. When the switch is closed, a measurement of the coil peak voltage may be obtained. The measurement may then be compared with the reference voltages generated by the ping generator 210.

For example, if during the scan of the switches performed in conjunction with the object detector 220's operation, a detection is made that the coil peak voltage is different, a detection of a object may be indicated.

The charge detector 230 determines whether the object detected is a chargeable device, such as mobile device 280. Often times, a object's inclusion on a wireless charging surface 270 may indicate or cause a coil peak voltage differential. However, the coil peak voltage differential may be positive. A positive voltage may indicate that a foreign object is placed on the wireless charging surface 270. In this case, the system 200 may essentially detect that even though an object is on the wireless charging surface 270, charging may be prevented.

In another example, there may be a negative voltage differential detected. This may be caused by a metallic object, such as a coin or paper clip (i.e. non-chargeable objects) resting on the wireless charging surface 270. The system 200 may be configured so that the negative charging differential is required to be greater than a predetermined threshold.

In another example, if a negative voltage differential is detected, and the voltage differential is above a predetermined threshold—the charge detector 230 may detect that a chargeable device is situated on the wireless charging surface 270.

The switch transmitter 240 determines which switch to activate (i.e. close) and which switches to de-activate (i.e. open) based on the detection made above. When the detectors 220 and 230 are determining whether a foreign object exists on the wireless charging surface 270, and is or is not a chargeable device, the coil peak voltage for each position is recorded.

Figure 3:
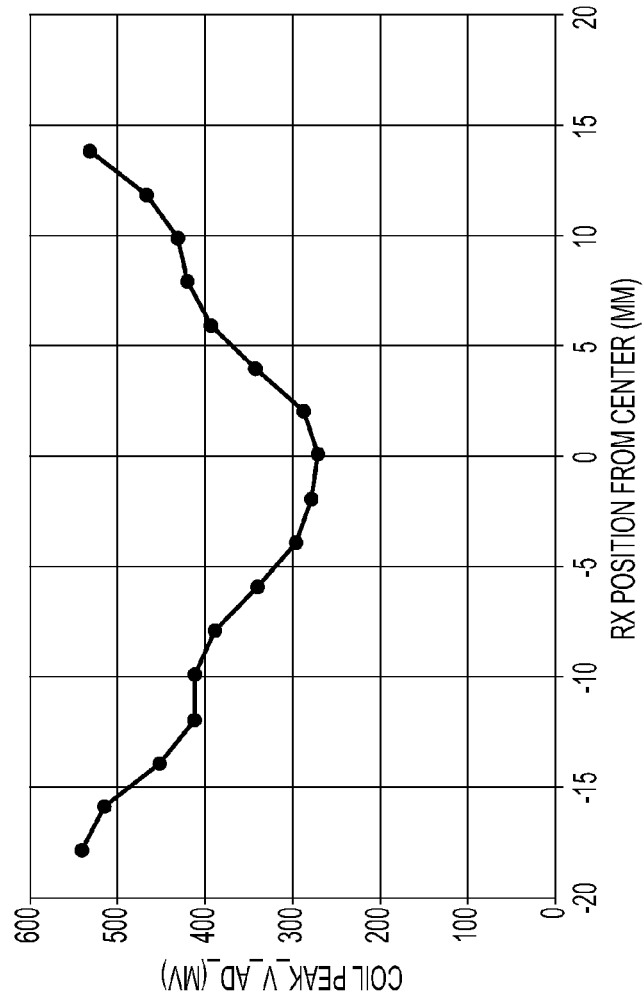
FIG. 3 illustrates an example graph of a coil peak voltage measurement versus a position from a center of a coil and the area around the coil.

FIG. 3 illustrates an example graph of a coil peak voltage measurement versus a position from a center of a coil and the area around the coil. As shown in FIG. 3, on the x-axis of the graph shown, various positions from the center of a coil are shown. On the y-axis, the coil peak voltage for each corresponding position is measured. As shown in FIG. 3, the various positions may represent readings from various positions on a wireless charging surface 270. Accordingly, as shown the example, the greatest differential is measured at a position of 0.

The switch transmitter 240 corresponds position 0 to a specific coil (of coils 271-273). In the example shown, position 0 corresponds to a center coil (i.e. coil 272). As coil 272 is controlled by switch 252, the switch transmitter 240 may transmit a signal to microcontroller 260 instructing switch 252 to be closed, while switches 251 and 253 remain open. In this way, the power source 250 may effectively charge mobile device 280 via a coil (in this case, coil 272) in which the mobile device 280's position corresponds with.

Figure 4:
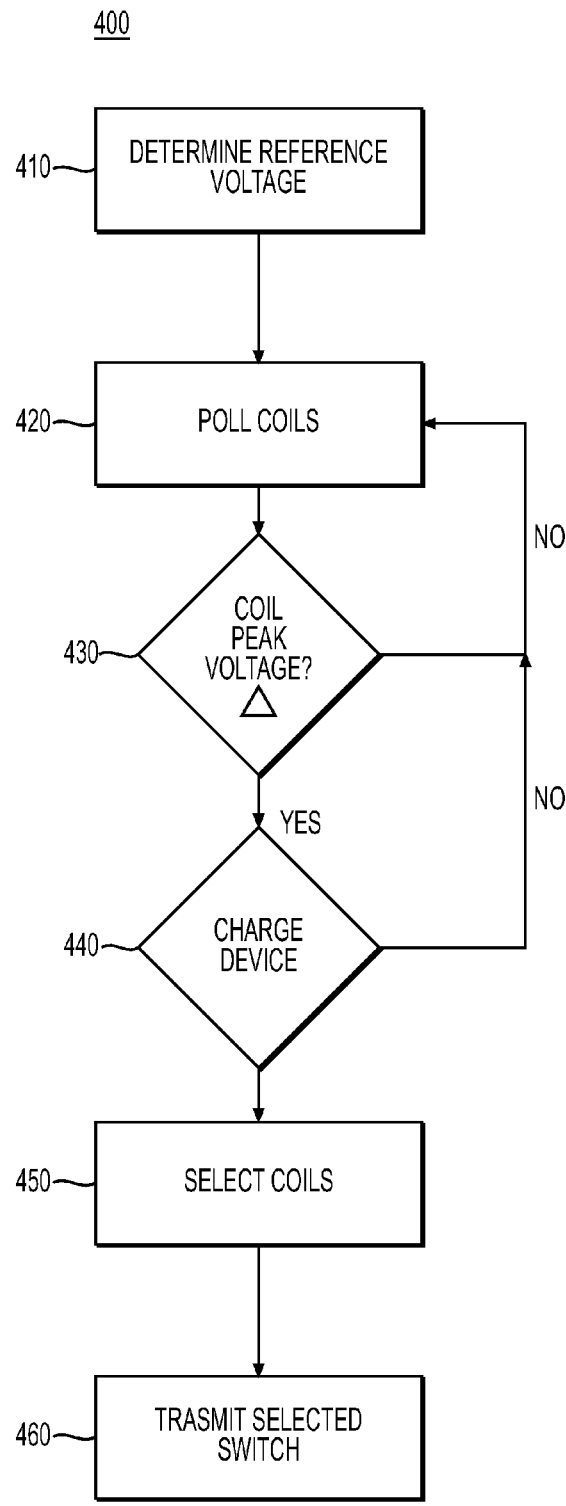
FIG. 4 is an example of a method for selecting a configuration of coils in response to a multi-coil wireless charging system initiating charging.

FIG. 4 illustrates a method 400 for selecting a configuration of coils in response to a multi-coil wireless charging system initiating charging. The method 400 may be implemented on a processor, such as computer 100. The method 400 may be implemented along with a wireless charging surface 270, as described above.

In operation 410, a reference voltage is determined by pinging each coil for a reference coil peak voltage. The reference coil peak voltage value of each coil represents a coil peak voltage value for each coil when no objects are on a wireless charging surface 270.

In operation 420, the various coils of the wireless charging surface 270 are polled to determine a present coil peak voltage value. In operation 430, a determination is made as to whether the present coil peak voltage value is different than the reference coil peak voltage for each coil, respectively. If no, method 400 repeats to operation 420. If yes, method 400 proceeds to operation 440.

In operation 440, a determination is made as to whether the object placed on the wireless charging surface 270 is a chargeable device. The analysis as whether the device is chargeable may be similar to the operation of element 230. If the object is determined to not be chargeable, the method 400 proceeds back to operation 220. If the object is determined to be chargeable, the method 400 proceeds to operation 450.

In operation 450, the switch corresponding to the coil is selected. The coil that most efficiently charges the mobile device may be selected and chosen in a similar fashion as described above with regards to element 240.

In operation 460, the chosen/selected switch is transmitted to a switch driving circuit (for example, a microcontroller 260 as shown in FIG. 2). The switch driving circuit may then close the corresponding switch associated with the wireless charging surface 270 that most effectively charges the chargeable device.

Figure 5A:
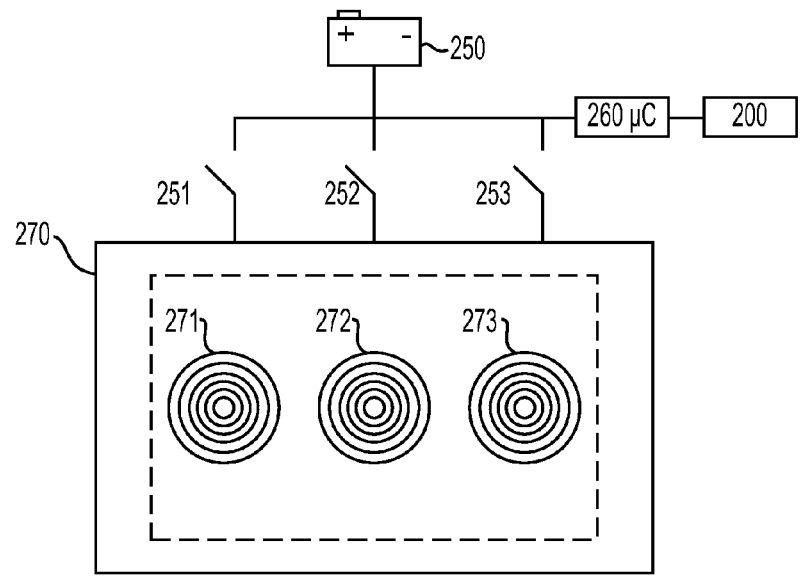
FIGS. 5(a) and 5(b) illustrate an example implementation of system shown in FIG. 2.
Figure 5B:
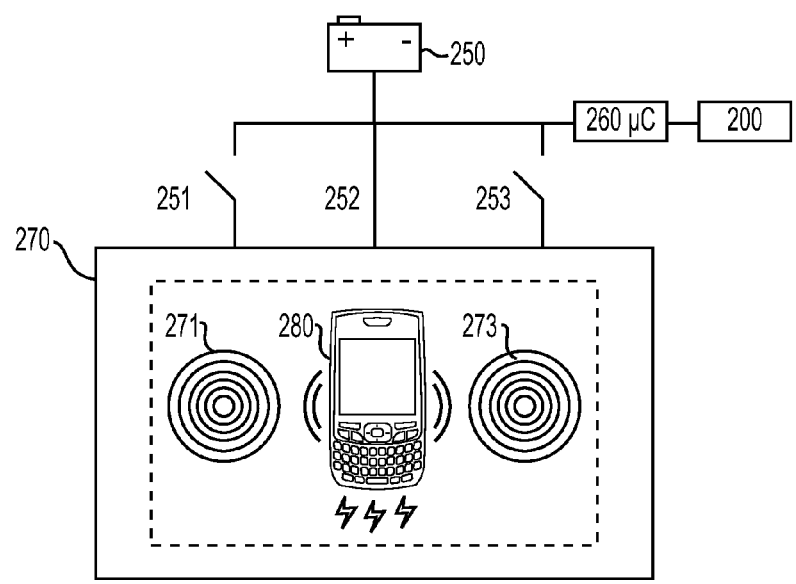

FIGS. 5(*a*) and 5(*b*) illustrate an example implementation of system 200 and/or method 400.

As shown in FIG. 5(*a*), no device is situated on the wireless charging surface 270. Accordingly, the switches 251-253 are opened/closed in a cycling fashion. At this juncture, various reference measurements may be taken by closing one switch at a time and cycle through all the coils.

Referring now to FIG. 5(*b*), a mobile device 280 is placed onto the wireless charging surface 270. Employing the aspects disclosed herein, system 200 is capable of detecting that a chargeable device is placed on the wireless charging surface 270, and that coil 272 is the most optimal charging point on the surface (thus, the closing of switch 252).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for selecting a configuration of coils in response to a multi-coil wireless charging system initiating charging, comprising:

a data store comprising a computer readable medium storing a program of instructions for the selecting of the configuration;

a processor that executes the program of instructions;

a ping generator to measure a reference coil peak voltage and a coil peak voltage for each of the coils of the multi-coil wireless charging system;

an object detector to detect that an object is placed on a surface associated with the wireless charging system, by cycling via the ping generator, to measure each coil of the multi-coil wireless charging system individually and storing an individual reading of the coil peak voltage for each coil, and correlating a position of the object based on the individual reading of the coil peak voltage, a charge detector to detect that the object is chargeable by comparing the stored coil peak voltage and the reference coil peak voltage, and in response to the object being chargeable, a switch transmitter determines which of the coils of the multi-coil wireless charging system to connect to a power source, the determination being based on a determined position based on the individual reading of the coil peak voltage for each coil.

2. The system according to claim 1, wherein the object detector detects that an object is placed on the surface by detecting a change in coil peak voltage from the reference coil peak voltage for each of the coils.

3. The system according to claim 2, wherein the charge detector determines that the object is chargeable by detecting a decrease in coil peak voltage from the reference coil peak voltage and a coil peak voltage measured when the object is placed on the surface.

4. The system according to claim 2, wherein the charge detector determines that the object is chargeable by detecting a decrease in the coil peak voltage.

5. The system according to claim 4, wherein the decrease is over a predetermined threshold.

6. The system according to claim 1, wherein the ping generator scans each of the coils and individually measures each of the coils when a respective coil is being scanned.

7. The system according to claim 1, wherein the selecting is periodically performed, with the switch transmitter being configured to update which of the multi-coils are powered based on the selecting being periodically performed.

* * * * *